(12) United States Patent
Kavali et al.

(10) Patent No.: US 12,013,845 B1
(45) Date of Patent: Jun. 18, 2024

(54) REAL TIME OPTIMIZATION APPARATUS USING SMART CONTRACTS FOR DYNAMIC CODE VALIDATION AND APPROVAL

(71) Applicant: Bank of America Corporation, Charlotte, NC (US)

(72) Inventors: Rama Venkata Kavali, Frisco, TX (US); Venugopala Rao Randhi, Telangana (IN); Pitti Venkateswarlu, Chengalpattu District (IN); Jyothi Gaddam, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/135,270

(22) Filed: Apr. 17, 2023

(51) Int. Cl.
| | |
|---|---|
| *G06F 16/23* | (2019.01) |
| *G06F 9/48* | (2006.01) |
| *G06F 9/50* | (2006.01) |
| *G06F 16/21* | (2019.01) |
| *G06N 10/40* | (2022.01) |
| *G06N 10/60* | (2022.01) |

(52) U.S. Cl.
CPC ........ *G06F 16/2386* (2019.01); *G06F 9/4843* (2013.01); *G06F 9/5077* (2013.01); *G06F 16/21* (2019.01); *G06F 16/2365* (2019.01); *G06N 10/40* (2022.01); *G06N 10/60* (2022.01); *G06F 2209/501* (2013.01); *G06F 2209/5019* (2013.01)

(58) Field of Classification Search
CPC ... G06F 16/2386; G06F 16/21; G06F 16/2365
See application file for complete search history.

(56) References Cited

U.S. PATENT DOCUMENTS

| | | |
|---|---|---|
| 2,919,854 A | 1/1960 | Singman |
| 8,826,305 B2 | 9/2014 | Filali-Adib et al. |
| 9,141,415 B2 | 9/2015 | Rasmussen et al. |
| 10,013,245 B2 | 7/2018 | Verlaguet |
| 10,216,509 B2 | 2/2019 | Martin Vicente et al. |
| 10,572,226 B2 | 2/2020 | Biskup et al. |
| 11,036,608 B2 | 6/2021 | Desikachari et al. |
| 11,163,675 B1 | 11/2021 | Pearson et al. |
| 11,237,952 B1 | 2/2022 | Pearson et al. |
| 11,368,211 B1 | 6/2022 | Boyapati et al. |
| 11,468,350 B2 | 10/2022 | Dalli et al. |

(Continued)

*Primary Examiner* — Jay A Morrison
(74) *Attorney, Agent, or Firm* — Banner & Witcoff, Ltd.

(57) ABSTRACT

A quantum computing platform may establish a smart contract approval and management model, including: rules for automated validation, and rules for smart contract approver validation. The computing platform may receive, from a workload processing system, a data feed indicating current workload information. The computing platform may generate, based on the data feed, a first container configuration output, defining a batch configuration for use in processing the data feed. The computing platform may validate, using the one or more rules for automated validation, the first container configuration output. The computing platform may send, to the workload processing system, the first container configuration output and one or more commands directing the workload processing system to process the data feed using the batch configuration defined by the first container configuration output, which may cause the workload processing system to process the data feed using the batch configuration.

20 Claims, 12 Drawing Sheets

(56) References Cited

U.S. PATENT DOCUMENTS

| | | |
|---|---|---|
| 11,544,613 B2 | 1/2023 | Olivadese et al. |
| 11,568,294 B2 | 1/2023 | Lubensky |
| 2008/0100554 A1 | 5/2008 | Mori |
| 2012/0066555 A1 | 3/2012 | Ganesh et al. |
| 2013/0339926 A1 | 12/2013 | Raundahl Gregersen et al. |
| 2015/0100951 A1 | 4/2015 | Raundahl Gregersen |
| 2016/0232017 A1 | 8/2016 | Raundahl Gregersen |
| 2020/0117434 A1 | 4/2020 | Biskup et al. |
| 2020/0358846 A1 | 11/2020 | Bonas et al. |
| 2021/0117308 A1 | 4/2021 | Burgos |
| 2022/0283858 A1 | 9/2022 | Regge et al. |

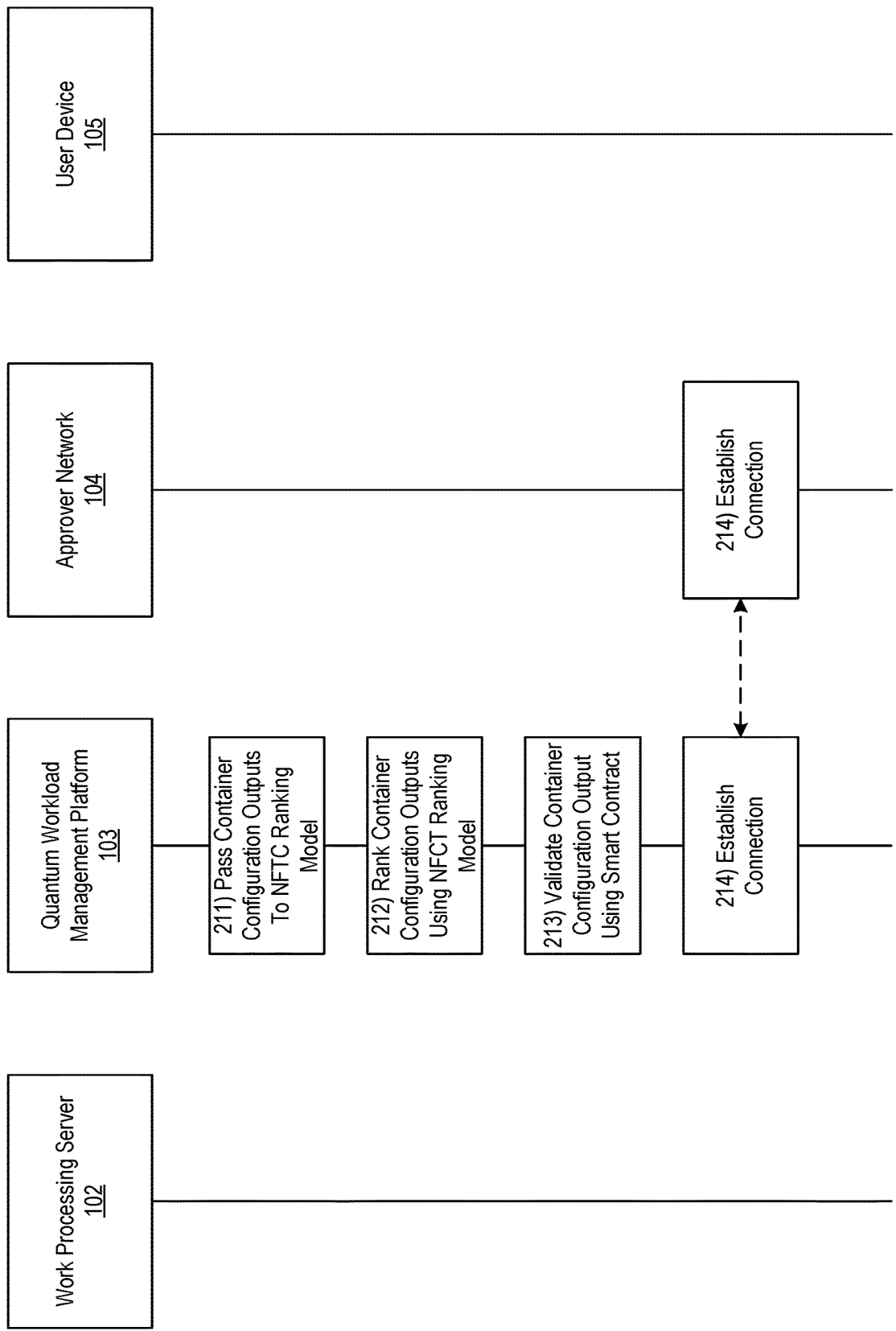

Please provide your approval/denial of the proposed container configuration in view of the currently in place smart contracts. Details of the configuration are shown below:

Performance Score: 85/100
Completeness Score: 100/100
Correctness Score: 100/100
Integrity Score: 90/100

Deny                                    Accept

FIG. 3

Congratulations – your workload request has been successfully processed!

FIG. 4

| Approver/Contract Type | Approver #1 | Approver #2 | Approver #3 | Approver #4 |
|---|---|---|---|---|
| Contract 1 | 40% | 10% | 30% | 20% |
| Contract 2 | 25% | 25% | 25% | 25% |

FIG. 6

| Approver/Optimization Criteria | Approver #1 | Approver #2 | Approver #3 | Approver #4 |
|---|---|---|---|---|
| Criteria 1 | 40% | 90% | 35% | 15% |
| Criteria 2 | 20% | 10% | 10% | 35% |
| Criteria 3 | 15% | 0% | 55% | 25% |
| Criteria 4 | 25% | 0% | 0% | 25% |
|  | 100% | 100% | 100% | 100% |

FIG. 7

REAL TIME OPTIMIZATION APPARATUS USING SMART CONTRACTS FOR DYNAMIC CODE VALIDATION AND APPROVAL

BACKGROUND

In some instances, requests, jobs, and/or other information may be sent for processing in batch form. In many instances, however, due to the volume of such requests, jobs, and/or other information, performance delays (e.g., in speed, accuracy, efficiency, and/or otherwise) may be experienced. Furthermore, such batches may be immutable regardless of how they are configured for processing. For example, once configured, the batches may be sent to a deployment/production environment for processing. Once sent, if any errors are identified, the entire process of selecting and deploying a configuration must be repeated (which may both reduce processing speed, and consume unnecessary computing resources). Accordingly, it may be important to improve the process by which batch configurations are assigned so as to improve operational efficiency of the corresponding requests, jobs, and/or otherwise.

SUMMARY OF THE INVENTION

Aspects of the disclosure provide effective, efficient, scalable, and convenient technical solutions that address and overcome the technical problems associated with batch processing optimization. In accordance with one or more embodiments of disclosure, a quantum computing platform comprising at least one processor, a communication interface, and memory storing computer-readable instructions may establish a smart contract approval and management model, which may include: 1) one or more rules for automated validation of container configuration outputs, and 2) one or more rules for validation of the container configuration outputs based on receipt of approver information from a plurality of approvers identified in the smart contract approval and management model. The computing platform may receive, from a workload processing system, a data feed indicating current workload information. The computing platform may generate, based on the data feed, a first container configuration output, which may define a batch configuration for use in processing the data feed. The computing platform may validate, using the one or more rules for automated validation, the first container configuration output. The computing platform may send, to the workload processing system, the first container configuration output and one or more commands directing the workload processing system to process the data feed using the batch configuration defined by the first container configuration output, which may cause the workload processing system to process the data feed using the batch configuration.

In one or more instances, the one or more rules for automated validation of container configuration outputs may define thresholds for each of a plurality of optimization criteria associated with the container configuration output. In one or more instances, the optimization criteria may include one or more of: 1) a performance score, corresponding to a processing speed of the container configuration outputs, 2) a completeness score, corresponding to a completeness or lack of completeness of data elements as a result of use of the container configuration outputs, 3) a correctness score, corresponding to an accuracy of data values as a result of use of the container configuration outputs; and 4) an integrity score, based on data corruption or lack of the data corruption occurring as a result of use of the container configuration outputs.

In one or more examples, generating the first container configuration output may include: 1) generating, using a container configuration model and based on the data feed, a plurality of container configuration outputs including the first container configuration output, 2) ranking, using a non-fungible token contract (NFTC) model and based on the optimization criteria, the plurality of container configuration outputs, and 3) selecting a highest ranked container configuration output of the plurality of container configuration outputs. In one or more examples, the plurality of container configuration outputs may include a second container configuration output, ranked immediately above the first container configuration output.

In one or more instances, the computing platform may identify that the second container configuration output fails to satisfy at least one of the one or more rules for automated validation. Based on identifying that the second container configuration output fails to satisfy the at least one of the one or more rules for automated validation, the computing platform may select the first container configuration output for comparison to the one or more rules for automated validation. In one or more instances, the computing platform may request, after validating, using the one or more rules for automated validation, the first container configuration output, approver information from one or more smart contract approvers identified in the smart contract approval and management model. The computing platform may receive the approver information, indicating whether or not the respective one or more smart contract approvers approve implementation of the first container configuration output, where sending the first container configuration output and one or more commands directing the workload processing system to process the data feed using the batch configuration defined by the first container configuration output may be based on identifying that consensus approval is achieved among the one or more smart contract approvers.

In one or more examples, the computing platform may identify that the consensus approval is not achieved for a second container configuration output. Based on identifying that the consensus approval is not achieved for the second container configuration output, the computing platform may select the first container configuration output for comparison to the one or more rules for automated validation, where the first container configuration output may be one of a plurality of container configuration outputs ranked immediately after the second container configuration output.

In one or more instances, a unique approval scheme may correspond to each of the one or more smart contract approvers. In one or more instances, the unique approval scheme may define thresholds, for each of the optimization criteria, to be satisfied to receive approval from the corresponding smart contract approver.

In one or more examples, the unique approval scheme may define a weighting scheme, indicating a weight to be applied to the approver information from each of the one or more smart contract approvers. In one or more examples, the computing platform may dynamically adjust, using a feedback loop, the unique approval scheme based on the consensus approval.

BRIEF DESCRIPTION OF DRAWINGS

The present disclosure is illustrated by way of example and is not limited in the accompanying figures in which like reference numerals indicate similar elements and in which:

FIGS. 2A-2E depict an illustrative event sequence for a real time optimization apparatus using quantum machine learning and non-fungible tokens for dynamic code evolution in accordance with one or more example embodiments.

FIGS. 3 and 4 depict illustrative user interfaces for a real time optimization apparatus using quantum machine learning and non-fungible tokens for dynamic code evolution in accordance with one or more example embodiments.

FIGS. 6 and 7 depict illustrative tables for a real time optimization apparatus using quantum machine learning and non-fungible tokens for dynamic code evolution in accordance with one or more example embodiments.

DETAILED DESCRIPTION

Figure 1A:
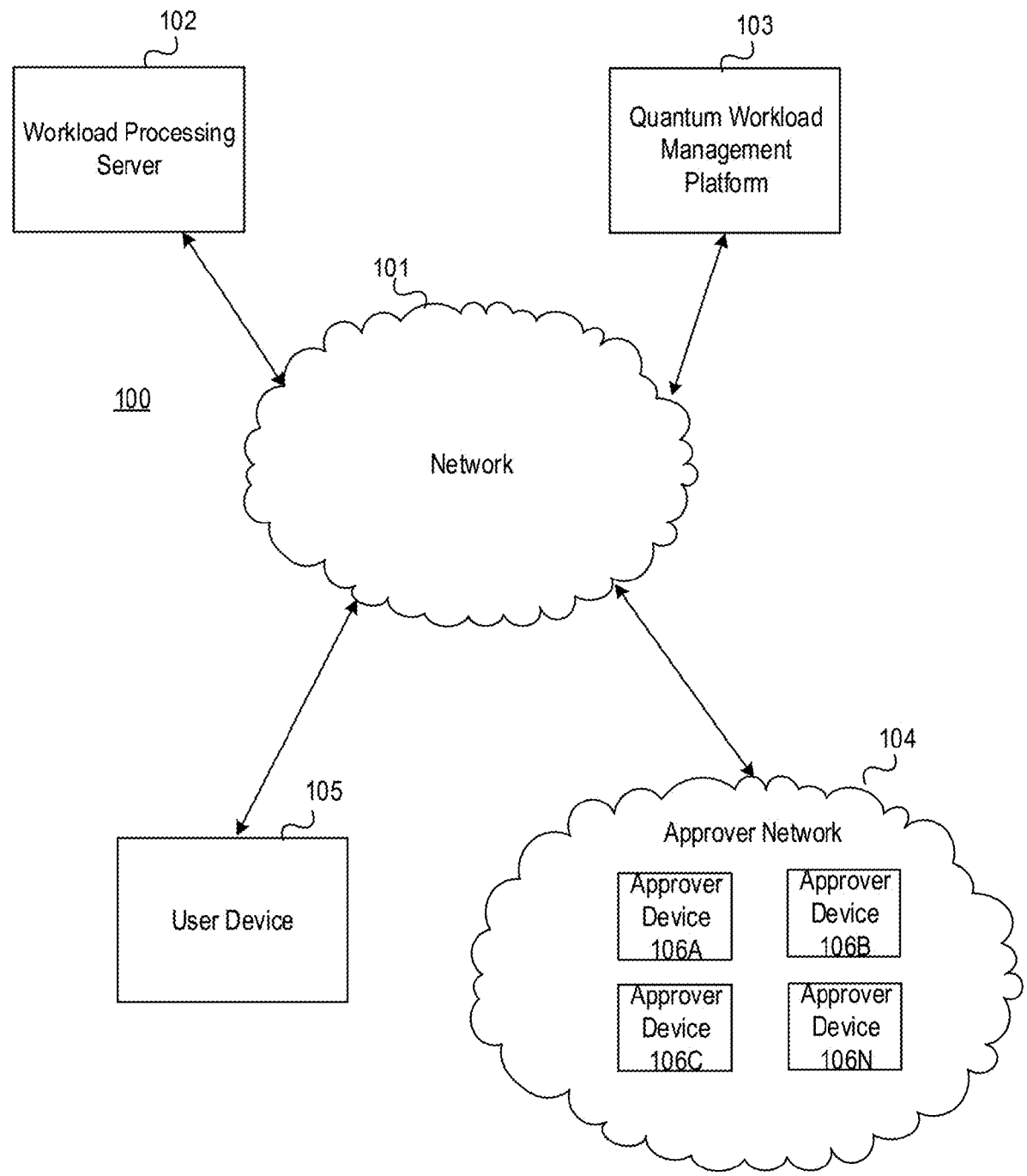
FIGS. 1A and 1B depict an illustrative computing environment for a real time optimization apparatus using quantum machine learning and non-fungible tokens for dynamic code evolution in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to training, applying, and refining container configuration models to optimize container configurations, as is described further below. In real time, the ability to split or merge workloads to optimize batch execution may be limited or non-existent. It may help to run a larger workload by splitting it into two or more smaller workloads running in parallel. Conversely, in a specific workload execution scenario, it may be helpful to merge two or more smaller workloads into a larger workload. Optionally, codes behind the workloads may be dynamically ingested/deployed, and/or maintenance may be performed on certain objects relevant to the workload in an automated fashion based on recommendations from an AI engine.

Accordingly, described herein is a solution to this technical problem. A quantum artificial intelligence/machine learning (AIML) apparatus may be integrated with a code base which may analyze the script in the code base. The apparatus may optimize the scripts in a number of ways as is described further below. For example, the apparatus may split a single workload with multiple batches to multiple workloads. The apparatus may merge the batches where the data manipulation language (DML) has the same tables. Based on the number of rows, the apparatus may opt for temporary tables instead of common table expression (CTE) tables.

In some instances, the apparatus may balance workloads. For example, the apparatus may find unused objects in idle time slots, and may run the maintenance workloads, with maintenance being based on the data consumption (e.g., archive old data temporarily if the process is only using one day of data out of thirty days of data, and restore it post process).

In some instances, the apparatus may provide real-time enhancements. The apparatus may perform delete and/or comment functions (e.g., if the batch is always updating/deleting/inserting 0 number of rows for more than a threshold number of days). The apparatus may comment the unexecuted batches based on historical log analysis. When a new column is added, SELECT fields may be used instead of using SELECT*.

In some instances, the apparatus may deploy non-fungible tokens (NFTs). For example, the apparatus may analyze the code in all application code bases, and assign an NFT value. The highest NFT may be given a code used by many applications. The apparatus may recommend the top ten NFT codes in each category across different platforms to the developers. If it is used, then the NFT of that code value may increase.

In some instances, the apparatus may provide testing and deployment functionality. After scripts are modified, the apparatus may run the code in a container. If considerable optimization is achieved, then the apparatus may send scripts for approval. The decentralized autonomous organization (DAO) may give approval based on the inputs by the application owner, product owner, development team, quality assurance team, and/or otherwise. Once the request is approved, the apparatus may check the code in, and an NFT may be created by blockchain using employee identifiers, application numbers/timestamps, categories, and/or other information. The code may also be deployed to a server.

In doing so, an artificial intelligence (AI) engine may determine to split or merge workloads in real time along with versioning (NFT) and deployment (AI driven continuous integration continuous delivery (CICD)). AIML algorithms may identify and schedule the object-based maintenance workloads for the respective batches. Code may be deployed using DAO. Quantum computing/communication may be used to calculate, deploy, and re-configure the workloads in real time. Each code base may be converted to NFTs and rankings may be assigned based on the performance/usage. The highest ranking NFT (code base) may be re-used to improve the application performance across the organization. These and other features are described in greater details below.

Figure 1B:
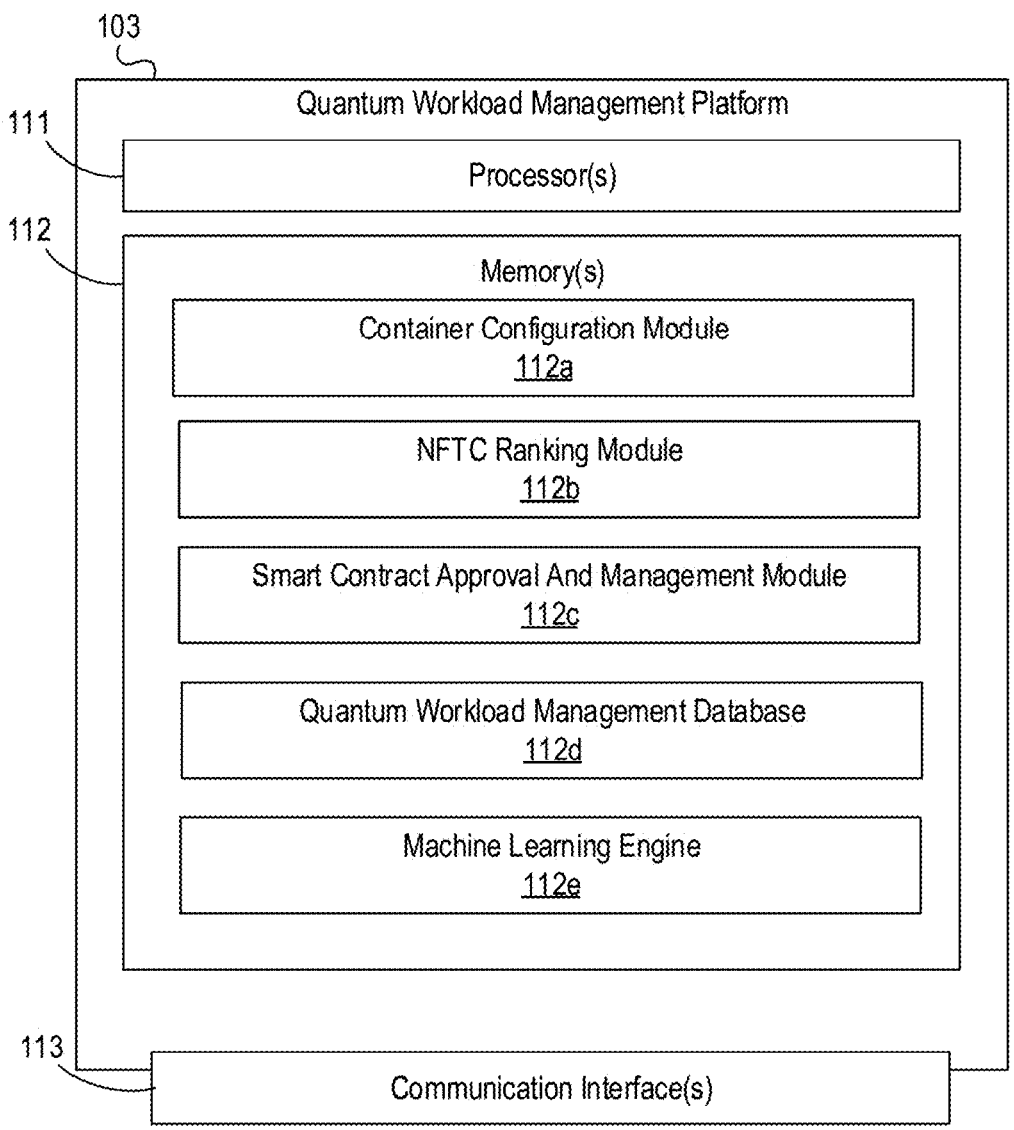

FIGS. 1A-1B depict an illustrative computing environment for real time and dynamic code evolution using quantum machine learning and NFTs in accordance with one or more example embodiments. Referring to FIG. 1A, computing environment 100 may include one or more computer systems. For example, computing environment 100 may include a workload processing server 102, quantum workload management platform 103, approver network 104 (which may, e.g., include approver devices such as approver devices 106A-106N), and a user device 105.

Workload processing server 102 may include one or more computing devices and/or other computer components (e.g., processors, memories, communication interfaces, or the like). For example, the workload processing server 102 may be configured to receive and/or otherwise process batch requests, such as transaction requests, file upload requests, data management requests, report generation requests, and/or other requests. In some instances, the workload processing server 102 may be configured to communicate with the quantum workload management platform 103 to optimize code (e.g., container configurations) for use in performing the batch processing. Although workload processing server 102 is illustrated as a system separate from quantum workload management platform 103, the workload processing server 102 may be integrated into the quantum workload management platform 103 without departing from the scope of the disclosure.

Quantum workload management platform 103 may be a quantum computer system that includes one or more computing devices and/or other computer components (e.g., processors, memories, communication interfaces, and/or other components). In addition, quantum workload management platform 103 may be configured to receive batch optimization requests (e.g., from the workload processing server 102), optimize the code to execute the requests (e.g., the container configurations), and/or cause processing of the batch optimization requests based on the optimization, as is described further below with regard to FIG. 1B.

Approver network 104 may include a collection of approver devices (e.g., approver devices 106A-106N). Although shown as a unique network, this is for illustrative purposes only, and approver network 104 may be and/or otherwise correspond to the network 190 without departing from the scope of the disclosure. Each approver device 106A-106N may be or include one or more user devices (e.g., laptop computers, desktop computer, smartphones, tablets, and/or other devices) configured for use in collecting approver information (e.g., indicating whether or not approval is given to proceed with various container configurations generated by the quantum workload management platform 103). In some instances, the approver devices 106A-106N may be configured to display graphical user interfaces (e.g., approval interfaces, or the like). Any number of such approver devices may be used to implement the techniques described herein without departing from the scope of the disclosure.

User device 105 may be or include one or more devices (e.g., laptop computers, desktop computer, smartphones, tablets, and/or other devices) configured for use in requesting batch processing (e.g., from the workload processing server 102). For example, the user device 105 may be operated or otherwise associated with clients and/or employees of an enterprise organization (e.g., an enterprise corresponding to the quantum workload management platform 103). In some instances, the user device 105 may be configured to display graphical user interfaces (e.g., processing confirmation interfaces, or the like). Any number of such user devices may be used to implement the techniques described herein without departing from the scope of the disclosure.

Computing environment 100 also may include one or more networks, which may interconnect workload processing server 102, quantum workload management platform 103, approver network 104, and user device 105. For example, computing environment 100 may include a network 101 (which may interconnect, e.g., workload processing server 102, quantum workload management platform 103, approver network 104, and user device 105).

In one or more arrangements, workload processing server 102, quantum workload management platform 103, approver devices 106A-106N, and user device 105 may be any type of computing device capable of receiving a user interface, receiving input via the user interface, and communicating the received input to one or more other computing devices. For example, workload processing server 102, quantum workload management platform 103, approver network 104, user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of workload processing server 102, quantum workload management platform 103, approver network 104, and user device 105 may, in some instances, be special-purpose computing devices configured to perform specific functions.

Referring to FIG. 1B, quantum workload management platform 103 may include one or more processors 111, memory 112, and communication interface 113. A data bus may interconnect processor 111, memory 112, and communication interface 113. Communication interface 113 may be a network interface configured to support communication between quantum workload management platform 103 and one or more networks (e.g., network 101, or the like). Memory 112 may include one or more program modules having instructions that when executed by processor 111 cause quantum workload management platform 103 to perform one or more functions described herein and/or one or more databases that may store and/or otherwise maintain information which may be used by such program modules and/or processor 111. In some instances, the one or more program modules and/or databases may be stored by and/or maintained in different memory units of quantum workload management platform 103 and/or by different computing devices that may form and/or otherwise make up quantum workload management platform 103. For example, memory 112 may have, host, store, and/or include container configuration module 112a, NFTC ranking module 112b, smart contract approval and management module 112c, quantum workload management database 112d, machine learning engine 112e. Container configuration module 112a may have instructions that direct and/or cause quantum workload management platform 103 to execute advanced optimization techniques to produce a plurality of candidate container configurations for use in batch processing. Non-fungible token contract (NFTC) ranking module 112b may have instructions that direct and/or cause quantum workload management platform 103 to rank the plurality of candidate container configurations and select a highest ranked available container configuration. Smart contract approval and management module 112c may have instructions that direct and/or cause quantum workload management platform 103 to manage smart contracts, automatically validate a selected candidate container configuration, and/or provide consensus validation techniques based on receipt of approval information from a plurality of smart contract approvers. Quantum workload management database 112b may store information used by container configuration module 112a, NFTC ranking module 112b, smart contract approval and management module 112c, and/or other modules in executing enhanced quantum workload management techniques and/or in performing other functions. Machine learning engine 112e may be used to train, deploy, and/or otherwise refine models used to support functionality of the container configuration module 112a, NFTC ranking module 112b, and/or smart contract approval and management module 112c through both initial training and one or more dynamic feedback loops, which may, e.g., enable continuous improvement of the quantum workload management platform 103 and further optimize the production of container configurations for use in batch processing.

Figure 2A:
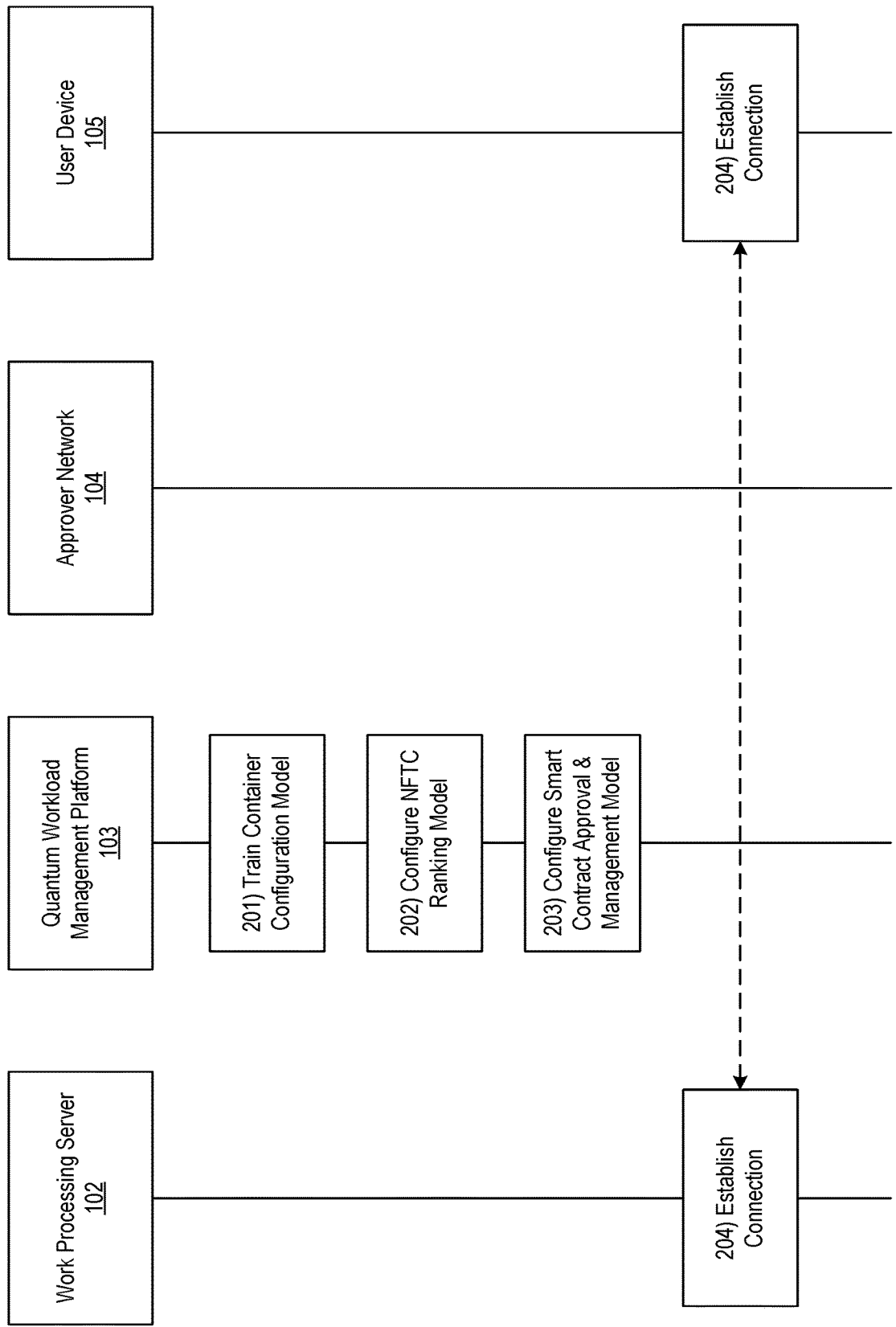

FIGS. 2A-2E depict an illustrative event sequence for real time and dynamic code evolution using quantum machine learning and NFTs in accordance with one or more example embodiments. Referring to FIG. 2A, at step 201, the quantum workload management platform 103 may train a container configuration generation model. For example, the quantum workload management platform 103 may obtain historical workload data such as data type information, data size information, job details, processing load information, bandwidth information, processing time information, job history information, container configuration information, error information corresponding to historical data batches, and/or other information. For example, the quantum workload management platform 103 may feed labelled historical workload data into the container configuration generation model (e.g., labelled based on a corresponding container configuration used to process the given workload data and/or any error information resulting from use of the corresponding container configuration in performing batch processing of the given workload data). In doing so, the quantum workload management platform 103 may train the container configuration generation model to establish stored correlations between the historical workload data and its corresponding label information, which may, e.g., enable the container configuration generation model to establish a correlation between input workload data and a corresponding container configuration so as to optimize (e.g., in terms of minimizing processing resources and likelihood of processing errors) the selection of the container configuration. For example, the quantum workload management platform 103 may train the container configuration generation model to establish a known optimal container configuration for batch processing requests for a particular file type and file size under a given set of current processing conditions. In some instances, these correlations may include exact matches between workload data, and thus an exact container configuration may be identified. In some instances, however, the quantum workload management platform 103 may train the container configuration generation model to identify non-exact matches based on similar file types, file sizes, loads, bandwidth calculations, and/or otherwise, and to predict a fuzzy match (e.g., despite an exact match not being available). For example, the quantum workload management platform 103 may predict the fuzzy match in the event that an exact container configuration match is not identified. In some instances, to do so, the quantum workload management platform 103 may generate a similarity score between the file types, file sizes, load conditions, bandwidth conditions, and/or other information, both for current processing conditions/requests (e.g., current workload information) and historical conditions/requests (e.g., historical workload information). If the similarity score exceeds a predetermined similarity threshold, the quantum workload management platform 103 may identify that a fuzzy match is identified. In these instances, if the corresponding container configuration is subsequently selected for use, the quantum workload management platform 103 may train the container configuration generation model to identify a correlation between this container configuration and the corresponding workload data (e.g., by refining the model using a dynamic feedback loop, as is described further below with regard to step 224). In doing so, the quantum workload management platform 103 may conserve computing resources by avoiding an extensive alternative evaluation to identify outputs where no exact match is identified.

In some instances, in training the container configuration generation model, the quantum workload management platform 103 may train a supervised learning model. For example, the quantum workload management platform 103 may train one or more of: decision trees, ensembles (e.g., boosting, bagging, random forest, or the like), neural networks, linear regression models, artificial neural networks, logistic regression models, support vector machines, and/or other supervised learning models. In some instances, once the container configuration generation model has been initially trained, the quantum workload management platform 103 may continue to train the container configuration generation model using one or more unsupervised learning techniques (e.g., classification, regression, clustering, anomaly detection, artificial neutral networks, and/or other supervised models/techniques) through a dynamic feedback loop (e.g., as is described further below with regard to step 224).

At step 202, the quantum workload management platform 103 may train and/or otherwise configure a non-fungible token contract (NFTC) ranking model. For example, the quantum workload management platform 103 may train the NFTC ranking model to score container configurations, produced by the container configuration model (e.g., trained at step 201), based on optimization criteria and/or the historical workload data described above at step 201. For example, the quantum workload management platform 103 may train the NFTC ranking model to generate one or more scores (which may, e.g., correspond to the optimization criteria) that may be used to rank the various container configurations. For example, the quantum workload management platform 103 may train the NFTC ranking model to generate a performance score, which may, e.g., reflect a speed at which a given batch processing request may be processed using the corresponding container configuration. For example, the NFTC ranking model may use the historical data type information, data size information, job details, processing speeds, processing load information, bandwidth information, processing time information, job history information, container configuration information, and/or other information to establish correlations between such information and a performance score. In some instances, the NFTC model may weight these factors evenly, or may apply different weightings to one or more of the input factors. Accordingly, when a new container configuration is input into the NFTC ranking model, the NFTC ranking model may be trained to identify a performance score for the new container configuration by comparing the new container configuration, a corresponding batch processing request, and/or other information to the historical workload information used to train the NFTC ranking model, and assigning a corresponding performance score accordingly. In these instances, the performance score may be indicative of an anticipated processing speed of a batch processing request using the given container configuration. For example, the NFTC ranking model may establish scoring thresholds based on anticipated processing time, which may, e.g., be used to output a performance score based on a given input. For example, the NFTC ranking model may assign a performance score of 10 if the anticipated processing time is below a first predetermined threshold, a score of 8 if the anticipated processing time is equal to or above the first predetermined threshold but below a second predetermined threshold, and so on (e.g., where higher performance scores indicate faster processing times and lower performance scores indicate slower processing times).

As another example, the quantum workload management platform 103 may train the NFTC ranking model to generate a completeness score, which may, e.g., reflect a percentage of parameters, included in a batch processing request, that are also anticipated to be present once a batch processing request has been processed using the corresponding container configuration (e.g., are all anticipated parameters, data fields, or the like present in the output). For example, the NFTC ranking model may use the historical data type information, data size information, job details, completeness information, processing load information, bandwidth information, processing time information, job history information, container configuration information, and/or other information to establish correlations between such information and a completeness score. In some instances, the NFTC model may weight these factors evenly, or may apply different weightings to one or more of the input factors. Accordingly, when a new container configuration is input into the NFTC ranking model, the NFTC ranking model may be trained to identify a completeness score for the new container configuration by comparing the new container configuration, a corresponding batch processing request, and/or other information to the historical workload information used to train the NFTC ranking model, and assigning a corresponding completeness score accordingly. In these instances, the completeness score may be indicative of an anticipated completeness resulting from processing of a batch processing request using the given container configuration. For example, the NFTC ranking model may establish scoring thresholds based on anticipated completeness, which may, e.g., be used to output a completeness score based on a given input. For example, the NFTC ranking model may assign a completeness score of 10 if the anticipated completeness percentage is above a first predetermined threshold, a score of 8 if the anticipated completeness percentage is equal to or less than the first predetermined threshold but above a second predetermined threshold, and so on (e.g., where lower completeness scores indicate weaker anticipated completeness and higher completeness scores indicate higher anticipated completeness).

As yet another example, the quantum workload management platform 103 may train the NFTC ranking model to generate a correctness score, which may, e.g., reflect a percentage of parameters, included in a batch processing request, whose values are anticipated to be correct once a batch processing request has been processed using the corresponding container configuration (e.g., are the anticipated values for the various parameters of the batch processing request the same as the values in the batch processing request itself). For example, the NFTC ranking model may use the historical data type information, data size information, job details, accuracy/correctness information, processing load information, bandwidth information, processing time information, job history information, container configuration information, and/or other information to establish correlations between such information and a correctness score. In some instances, the NFTC model may weight these factors evenly, or may apply different weightings to one or more of the input factors. For example, different weighting may be applied for different file types, different workload conditions, and/or otherwise. Accordingly, when a new container configuration is input into the NFTC ranking model, the NFTC ranking model may be trained to identify a correctness score for the new container configuration by comparing the new container configuration, a corresponding batch processing request, and/or other information to the historical workload information used to train the NFTC ranking model, and assigning a corresponding correctness score accordingly. In these instances, the correctness score may be indicative of an anticipated parameter value accuracy resulting from processing of a batch processing request using the given container configuration. For example, the NFTC ranking model may establish scoring thresholds based on anticipated correctness, which may, e.g., be used to output a correctness score based on a given input. For example, the NFTC ranking model may assign a correctness score of 10 if the anticipated value accuracy percentage is above a first predetermined threshold, a score of 8 if the anticipated value accuracy percentage is equal to or less than the first predetermined threshold but above a second predetermined threshold, and so on (e.g., where lower correctness scores indicate lower accuracy and higher completeness scores indicate higher accuracy).

As yet another example, the quantum workload management platform 103 may train the NFTC ranking model to generate an integrity score, which may, e.g., reflect a percentage of parameters, included in a batch processing request, whose values are anticipated to be valid (e.g., not corrupted and/or otherwise erroneously modified) once a batch processing request has been processed using the corresponding container configuration (e.g., what is an anticipated data integrity if the corresponding container configuration is used). For example, the NFTC ranking model may use the historical data type information, data size information, job details, integrity information, processing load information, bandwidth information, processing time information, job history information, container configuration information, and/or other information to establish correlations between such information and an integrity score. In some instances, the NFTC model may weight these factors evenly, or may apply different weightings to one or more of the input factors. Accordingly, when a new container configuration is input into the NFTC ranking model, the NFTC ranking model may be trained to identify an integrity score for the new container configuration by comparing the new container configuration, a corresponding batch processing request, and/or other information to the historical workload information used to train the NFTC ranking model, and assigning a corresponding integrity score accordingly. In these instances, the integrity score may be indicative of an anticipated data integrity resulting from processing of a batch processing request using the given container configuration. For example, the NFTC ranking model may establish scoring thresholds based on anticipated integrity, which may, e.g., be used to output an integrity score based on a given input. For example, the NFTC ranking model may assign an integrity score of 10 if the anticipated percentage of corrupted values is below a first predetermined threshold, a score of 8 if the anticipated percentage of corrupted values is greater than or equal to the first predetermined threshold but below a second predetermined threshold, and so on (e.g., where higher integrity scores indicate a lower likelihood of data corruption and lower integrity scores indicate a higher likelihood of data corruption).

In some instances, in training the NFTC ranking model, the quantum workload management platform 103 may train a supervised learning model. For example, the quantum workload management platform 103 may train one or more of: decision trees, ensembles (e.g., boosting, bagging, random forest, or the like), neural networks, linear regression models, artificial neural networks, logistic regression models, support vector machines, and/or other supervised learning models to initially train the NFTC ranking model using labelled historical workload information. In some instances, once the NFTC ranking model has been initially trained, the quantum workload management platform 103 may continue to train the NFTC ranking model using one or more unsupervised learning techniques (e.g., classification, regression, clustering, anomaly detection, artificial neutral networks, and/or other supervised models/techniques) through a dynamic feedback loop (e.g., as is described further below with regard to step 224).

In some instances, the quantum workload management platform 103 may train the NFTC ranking model to rank the container configuration, output by the container configuration generation model for a given batch processing request, based on the above described optimization scores. In these instances, the quantum workload management platform 103 may use one or more of the above described scores to rank the container configurations from lowest to highest. In some instances, the quantum workload management platform 103 may use the above described scores to generate an overall ranking score. To do so, the quantum workload management platform 103 may, e.g., equally weight each of the above described scores and/or apply different weights to one or more of the above described scores. For example, the quantum workload management platform 103 may output an overall ranking score for a given container configuration using the following formula: overall ranking score= (0.1*performance score)+(0.3*completeness score)+ (0.3*correctness score)+(0.3*integrity score). In some instances, other different weighting schemes may be applied without departing from the scope of the disclosure.

The quantum workload management platform 103 may further train the NFTC ranking model to rank any output container configurations based on the above described scores (e.g., one or more optimization scores and/or an overall ranking score). For example, the NFTC ranking model may be trained to rank the container configurations from lowest to highest based on the overall ranking scores.

At step 203, the quantum workload management platform 103 may establish and/or otherwise configure a smart contract approval and management model. In doing so, the quantum workload management platform 103 may effectively configure two aspects of the smart contract approval and management model, which may, e.g., include one or more of: an automated smart contract validation model, or a consensus approval smart contract validation model.

With regard to the automated smart contract validation, the quantum workload management platform 103 may establish a plurality of optimization rules, which may, e.g., be defined by a smart contract store in the smart contract approval and management model. In some instances, each type of batch processing request may have a unique smart contract defining optimization rules for the corresponding batch processing request. In some instances, the plurality of optimization rules for the automated smart contract validation model may define thresholds for each of the optimization criteria, indicating a minimum value of the corresponding scores (e.g., performance score, completeness score, correctness score, integrity score, overall ranking score, or the like), which must, e.g., be satisfied to achieve automated approval. In some instances, the thresholds may be originally set as equivalent values (e.g., a threshold of 8 for each optimization criteria, or the like) or different values (e.g., a threshold of 5 for performance score and 8 for the completeness score, or the like). In some instances, the automated smart contract validation model may dynamically modify these thresholds (e.g., using a dynamic feedback loop as described further below with regard to step 221).

Referring to the consensus approval smart contract validation, the smart contract approval and management model may be configured with and/or otherwise maintain a list of approvers for a given smart contract. Similarly, the smart contract approval and management model may be configured to manage optimization thresholds for each approver. For example, for a given container configuration, a first approver may have a first performance threshold, whereas a second approver may have a second performance threshold. Similarly, the smart contract approval and management model may be configured to maintain weighting information for the different approvers (e.g., four approvers may be weighted differently or the same based on, for example, response rate, employee information, and/or otherwise). This is shown, for example, in Table 700 of FIG. 7, which illustrates a unique approval scheme for each of the different approvers. In some instances, the automated smart contract validation model may dynamically modify these thresholds and/or weightings (e.g., using a dynamic feedback loop as described further below with regard to step 221).

At step 204, the user device 105 may establish a connection with the work processing server 102. For example, the user device 105 may establish a first wireless data connection with the work processing server 102 to link the work processing server 102 to the user device 105 (e.g., in preparation for sending workload processing requests). In some instances, the user device 105 may identify whether or not a connection is already established with the work processing server 102. If the user device 105 identifies that a connection is already established with the work processing server 102, the user device 105 might not re-establish the connection. If the user device 105 identifies that a connection is not yet established with the work processing server 102, the user device 105 may establish the first wireless data connection as described herein.

Figure 2B:
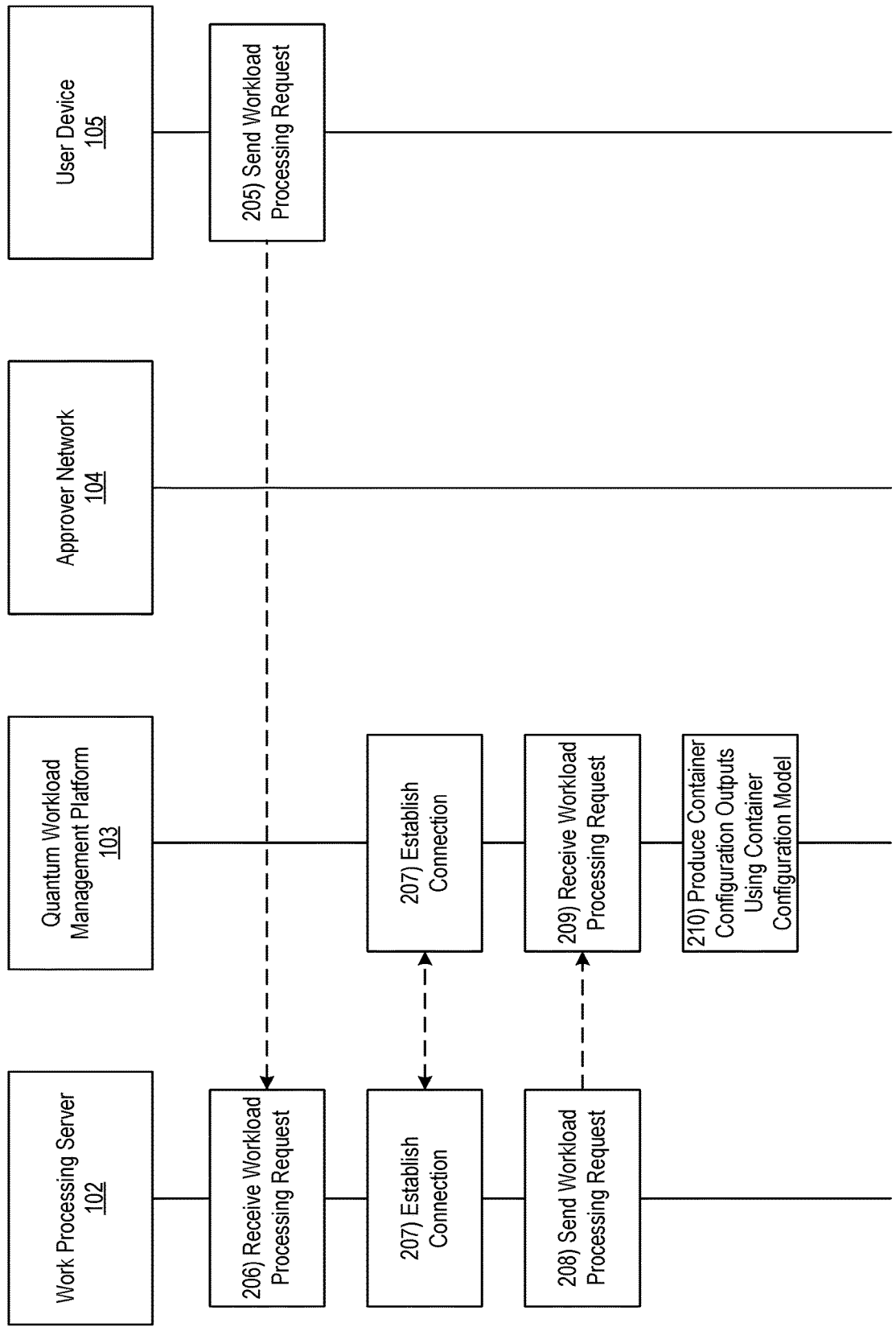

Referring to FIG. 2B, at step 205, the user device 105 may send a workload processing request to the work processing server 102. For example, the user device 105 may send a request to perform a batch file upload, perform batch execution of transactions, perform batch report generation, and/or otherwise. In some instances, the user device 105 may send the workload processing request to the work processing server 102 while the first wireless data connection is established.

At step 206, the work processing server 102 may receive the workload processing request sent at step 205. For example, the work processing server 102 may receive the workload processing request while the first wireless data connection is established.

At step 207, the work processing server 102 may establish a connection with the quantum workload management platform 103. For example, the work processing server 102 may establish a second wireless data connection to link the work processing server 102 to the quantum workload management platform 103 (e.g., in preparation for sending workload processing requests). In some instances, the work processing server 102 may identify whether or not a connection is already established with the quantum workload management platform 103. If a connection is already established with the quantum workload management platform 103, the workload processing server 102 might not re-establish the connection. Otherwise, if a connection is not yet established with the quantum workload management platform 103, the workload processing server 102 may establish the second wireless data connection as described herein.

At step 208, the work processing server 102 may forward the workload processing request, received at step 206, to the quantum workload management platform 103. For example, the work processing server 102 may forward the workload processing request to the quantum workload management platform 103 while the second wireless data connection is established. In some instances, the work processing server 102 may forward a plurality of requests, as part of a batch data feed indicating current workload information.

At step 209, the quantum workload management platform 103 may receive the workload processing request (and/or the batch data feed) sent at step 208. For example, the quantum workload management platform 103 may receive the workload processing request via the communication interface 113 and while the second wireless data connection is established. Although receipt of the workload processing request is illustrated as being routed through the work processing server 102, in some instances, the workload processing request may, in some instances, be sent directly from the user device 105 without departing from the scope of the disclosure.

At step 210, the quantum workload management platform 103 may produce container configuration outputs for the workload processing request, using the container configuration generation model (e.g., trained above at step 201). For example, the quantum workload management platform 103 may feed the workload processing request, the data feed, current workload information, or the like into the container configuration generation model, which may identify, e.g., based on the training performed at step 201, a plurality of container configurations that may be used in processing the workload processing request (e.g., by comparing features of the workload processing request, network conditions, and/or other current information to the historical workload information stored in and/or otherwise used to train the container configuration model, and outputting corresponding container configurations). For example, the quantum workload management platform 103 may produce a plurality of candidate container configuration outputs. For example, these configurations may indicate whether a single workload containing multiple batches should be split into multiple workloads, whether batches should be merged, table configurations based on a number of data rows, and/or other configuration details. Additionally or alternatively, the plurality of candidate container outputs may find unused objects, such as idle time slots, and run maintenance workloads (e.g., based on data consumption). For example, a particular container output may cause old data to be temporarily archived, and restored post processing. Additionally or alternatively, the plurality of candidate container outputs may define real time enhancements, such as delete/comment (e.g., if a batch is always updating/deleting/inserting zero rows for more than a threshold number of days), commenting the unexecuted batches based on historical log analysis, using SELECT fields when a new column is added rather than SELECT*. In some instances, in generating the plurality of candidate container outputs, the quantum workload management platform 103 may generate NFTs, which may each be representative of the various candidate container outputs. In some instances, in generating the plurality of candidate container outputs, the quantum workload management platform 103 may generate candidate containers that optimize processing of the batch data feed/workload processing request in terms of minimizing both processing speed and computing resources.

Referring to FIG. 2C, at step 211, the quantum workload management platform 103 may pass the plurality of candidate container configuration outputs (and/or the corresponding NFTs) to the NFTC ranking model (e.g., trained above at step 202). At step 212, once the plurality of candidate container configuration outputs are received by the NFTC ranking model may input each candidate container configuration output into the NFTC ranking model to produce (e.g., by comparing features of the container configuration outputs, network conditions, and/or other information to the historical workload data used to train the NFTC ranking model) corresponding optimization scores (e.g., the performance score, completeness score, correctness score, integrity score, and/or overall ranking score as described above). Once the NFTC ranking model has generated the scores for the candidate container configuration outputs, the NFTC ranking model may rank the candidate container configuration outputs accordingly. For example, the NFTC ranking model may rank the plurality of candidate container configuration outputs from lowest to highest based on their overall ranking scores. For example, the NFTC ranking model may produce a ranked list of NFTs corresponding to the plurality of candidate container configuration outputs.

At step 213, the quantum workload management platform 103 may select a highest ranked available candidate container configuration output (e.g., of the ranked candidates from step 212), and may perform automated validation of the given container configuration output against a plurality of rules defined in a corresponding smart contract (e.g., the smart contracts of the smart contract approval and management model as configured at step 203). For example, the quantum workload management platform 103 may compare one or more of the optimization scores (e.g., the performance score, completeness score, correctness score, integrity score, and/or overall ranking score as described above) to thresholds defined in the corresponding smart contract. In some instances, the quantum workload management platform 103 may compare additional or alternative parameters to those corresponding to the optimization scores (e.g., execution metrics, data quality metrics, ancillary benefits, and/or other information). If the smart contract approval and management model identifies that all of the optimization scores meet or exceed the thresholds defined in the smart contract, the quantum workload management platform 103 may proceed to step 214. Otherwise, if the smart contract approval and management model identifies that at least one of the optimization scores does not meet or exceed the corresponding threshold, the quantum workload management platform 103 may select the next highest ranked candidate container configuration output from the ranked list generated at step 212, and repeat step 213. Such automated validation may, in some instances, conserve computing resources and/or network bandwidth that may be consumed by requesting and analyzing consensus information from a plurality of network approvers as is described further below with regard to step 214-218.

At step 214, the quantum workload management platform 103 may establish a connection with the approver network 104. For example, the quantum workload management platform 103 may establish a third wireless data connection with the approver network 104 to link the quantum workload management platform 103 to the approver network 104 (e.g., in preparation for sending smart contract approval requests). In some instances, the quantum workload management platform 103 may identify whether or not a connection is already established with the approver network 104. If a connection is already established with the approver network 104, the quantum workload management platform 103 might not re-establish the connection. If a connection is not yet established with the approver network 104, the quantum workload management platform 103 may establish the third wireless data connection as described herein.

Figure 2D:
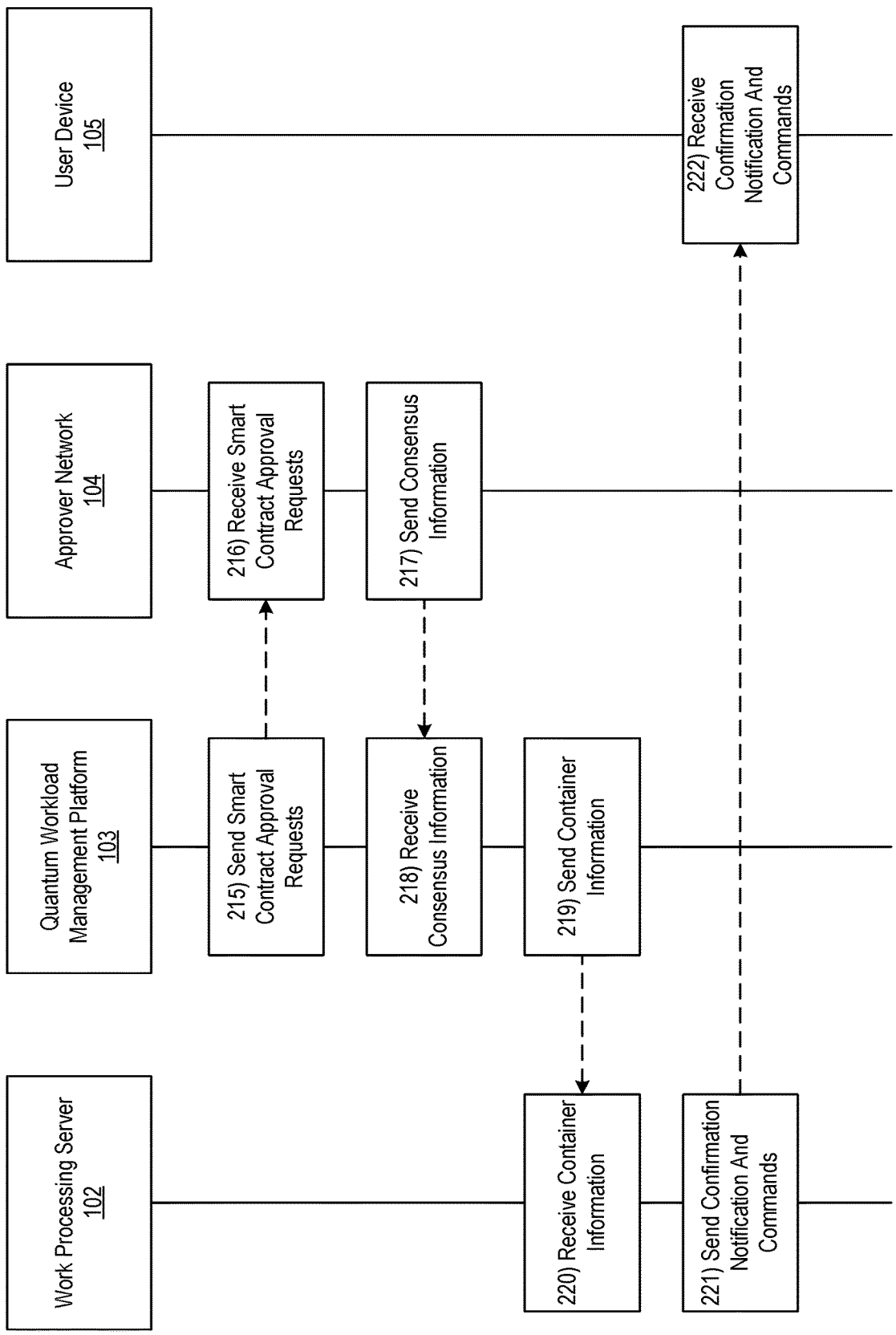

Referring to FIG. 2D, at step 215, the quantum workload management platform 103 may identify one or more approvers corresponding to the smart contract (e.g., using the smart contract approval and management model). After identifying the one or more approvers, the quantum workload management platform 103 may send a smart contract approval request (which may, e.g., include information of the container configuration output validated at step 213) to each corresponding approver of the approver network 104 (e.g., approver devices 106A-106N). In some instances, the quantum workload management platform 103 may send, to each of the approver devices 106A-106N, the corresponding optimization thresholds for use in validation of the container configuration output validated at step 213. In some instances, these optimization thresholds may be different for different approvers (e.g., as shown in Table 700 of FIG. 7). For example, the quantum workload management platform 103 may send the smart contract approval requests to the approver network 104 via the communication interface 113 and while the third wireless data connection is established.

At step 216, the approver network 104 (e.g., approver devices 106A-106N) may receive the smart contract approval requests sent at step 215. For example, the approver devices 106-106N may receive the smart contract approval requests while the third wireless data connection is established.

At 217, the approver network 104 (e.g., approver devices 106A-106N) may receive and send approver/consensus information indicating whether or not each corresponding approve approves use of the container configuration output. For example, the approver devices 106A-106N may display a graphical user interface similar to graphical user interface 300, which is shown in FIG. 3. For example, this interface may include each of the various optimization scores identified for the selected container configuration, and may display them for review and approval by the corresponding approver. In some instances, the approver network 104 may send the approver/consensus information to the quantum workload management platform 103 while the third wireless data connection is established.

At step 218, the quantum workload management platform 103 may receive the approval/consensus information sent at step 217. For example, the quantum workload management platform 103 may receive the consensus information via the communication interface 113 and while the third wireless data connection is still established. Upon receiving the consensus information, the quantum workload management platform 103 may validate the consensus information using the weighting information for each smart contract approver (e.g., which may, for example, be stored in a table similar to Table 600 of FIG. 6, which may be maintained in the smart contract approval and management model). For example, the smart contract approval and management model may identify whether consensus approval (e.g., a majority, or more than another predetermined threshold) is achieved, by weighting responses from the various approvers. To illustrate using the weighting scheme of Table 600, if contract #1 is used for validation, approval from both Approver #1 and Approver #4 may be sufficient for validation, whereas approval from both Approver #2 and Approver #4 may be insufficient (despite comprising 50% of the approvers). In instances where the quantum workload management platform 103 successfully validates the consensus information, the quantum workload management platform 103 may proceed to step 219. Otherwise, the quantum workload management platform 103 may return to the ranked list of candidate container configurations generated at step 212, select the next highest ranked candidate container configuration output, and return to step 213 to initiate validation of the alternative container configuration.

At step 219, the quantum workload management platform 103 may send information of the validated container configuration to the work processing server 102. For example, the quantum workload management platform 103 may send the information via the communication interface 113 and while the second wireless data connection is established. In some instances, the quantum workload management platform 103 may also send one or more commands directing the work processing server 102 to execute and/or otherwise process the batch processing request using the validated container configuration.

At step 220, the quantum workload management platform 102 may receive the information of the validated container configuration. For example, the quantum workload management platform 102 may receive the information of the validated container configuration while the second wireless data connection is established. In some instances, the quantum workload management platform 102 may also receive the one or more commands directing the work processing server 102 to execute and/or otherwise process the batch processing request using the validated container configuration. Based on or in response to the one or more commands directing the work processing server 102 to execute and/or otherwise process the batch processing request, the work processing server 102 may process the batch processing request accordingly.

At step 221, the work processing server 102 may send a confirmation notification, indicating that the batch processing request has been completed, to the user device 105. For example, the work processing server 102 may send the confirmation notification to the user device 105 while the first wireless data connection is established. In some instances, the work processing server 102 may also send one or more commands directing the user device 105 to display the confirmation notification.

At step 222, the user device 105 may receive the confirmation notification sent at step 221. For example, the user device 105 may receive the confirmation notification while the first wireless data connection is established. In some instances, the user device 105 may also receive the one or more commands directing the user device 105 to display the confirmation notification.

Figure 2E:
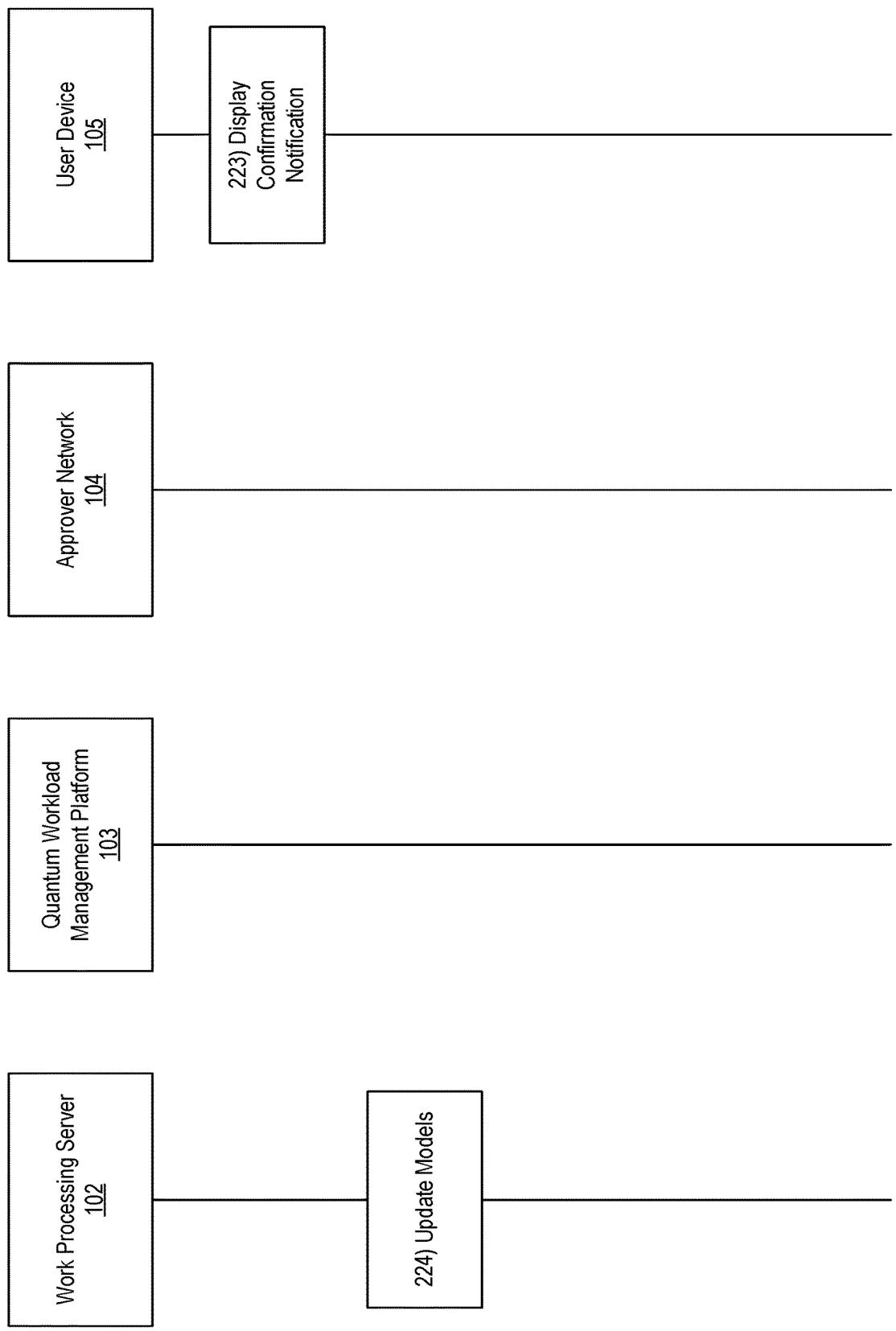

Referring to FIG. 2E, at step 223, based on or in response to the one or more commands directing the user device 105 to display the confirmation notification, the user device 105 may display the confirmation notification. For example, the user device 105 may display a graphical user interface similar to graphical user interface 400, which is shown in FIG. 4.

At step 224, the quantum workload management platform 103 may update one or more of the models, trained, configured, and/or otherwise established at steps 201-203 (e.g., the container configuration model, the NFTC ranking model, and/or the smart contract approval and management model), based on one or more or the model outputs described above, the batch processing request, and/or other information. In doing so, the quantum workload management platform 103 may continue to refine the models using a dynamic feedback loop, which may, e.g., increase the accuracy and effectiveness of the models in generating, scoring, ranking, selecting, and/or otherwise validating container configurations for batch processing.

For example, the quantum workload management platform 103 may feed parameters and/or characteristics of the batch processing request, candidate container configuration outputs (generated by the container configuration generation model), the selected container configuration, any errors and/or other performance information corresponding to execution of the batch processing request using the selected container configuration, and/or other information into the container configuration generation model, which may cause the container configuration generation model to continuously improve in the generation of candidate container configurations (e.g., in terms of generating container configurations that may be most optimal (e.g., balancing speed, error rate, or the like) for the use in executing batch processing requests).

Additionally or alternatively, the quantum workload management platform 103 may feed parameters and/or characteristics of the batch processing request, candidate configurations, ranking and/or scoring information produced by the NFTC ranking model, and/or other information into the NFTC ranking model, which may cause the NFTC ranking model to continuously improve in the scoring and ranking of candidate container configurations (e.g., in terms of accurately scoring and ranking the candidate container configurations based on the above described optimization parameters and/or other information).

Additionally or alternatively, the quantum workload management platform 103 may feed any of the above described and/or other information (e.g., such as information received from the various smart contract approvers, requests to modify the smart contracts, and/or other information) into the smart contract approval and management model to dynamically adjust one or more optimization and/or approver thresholds stored therein. For example, the smart contract approval and management model may include a dynamic feedback loop that may cause automated adjustment of one or more optimization thresholds in the smart contract (e.g., Table 700), approval consensus weighting (e.g., Table 600), and/or other information, which may improve the validation process for container configurations (e.g., in terms of sufficiently validating container configurations for deployment based on permissible error rates, and/or other information.

In some instances, the quantum workload management platform 103 may continuously refine any and/or all of the models. In some instances, the quantum workload management platform 103 may maintain accuracy thresholds for one or more of the models, and may pause refinement (through the dynamic feedback loops) of a given model if the corresponding accuracy is identified as greater than the corresponding accuracy threshold. Similarly, if the accuracy fails to be equal or less than the given accuracy threshold, the quantum workload management platform 103 may resume refinement of the corresponding model through the corresponding dynamic feedback loop.

Figure 5:
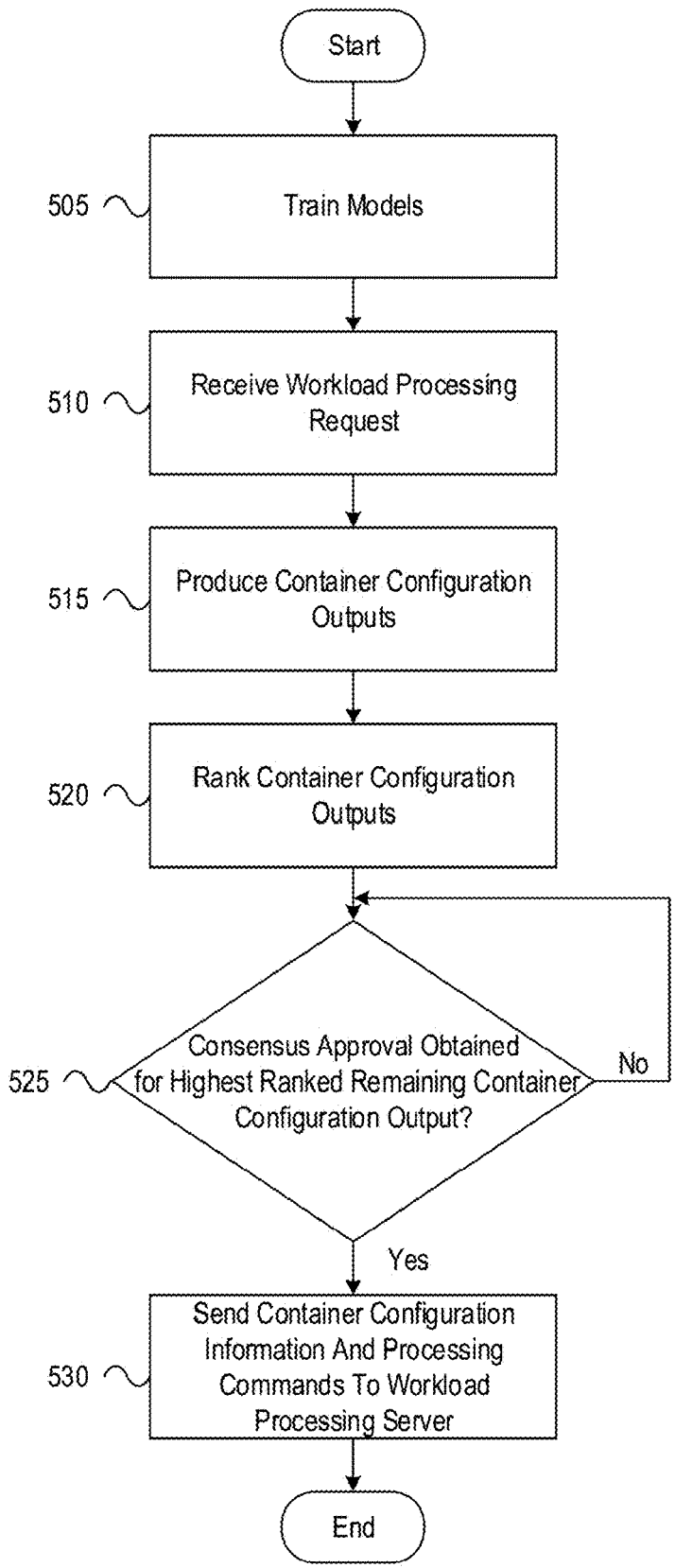
FIG. 5 depicts an illustrative method for a real time optimization apparatus using quantum machine learning and non-fungible tokens for dynamic code evolution in accordance with one or more example embodiments.

FIG. 5 depicts an illustrative method for a real time optimization apparatus using quantum machine learning and non-fungible tokens for dynamic code evolution in accordance with one or more example embodiments. Referring to FIG. 5, at step 505, a quantum computing platform comprising one or more processors, memory, and a communication interface may train a container configuration model, an NFTC ranking model, and a smart contract approval and management model. At step 510, the quantum computing platform may receive a workload processing request. At step 515, the quantum computing platform may input the workload processing request into the container configuration model to produce container configuration outputs. At step 520, the quantum computing platform may rank the container configuration outputs using the NFTC ranking model. At step 525, the quantum computing platform may use the smart contract approval and management model to identify whether or not consensus approval was obtained for the highest ranked container configuration output. If such consensus approval was not obtained, the quantum computing platform may proceed to the next highest ranked container configuration output and repeat the consensus approval at step 525. If such consensus approval was obtained, the quantum computing platform may proceed to step 530. At step 530, the quantum computing platform may send container configuration information and processing commands to a workload processing server.

Figure 8:
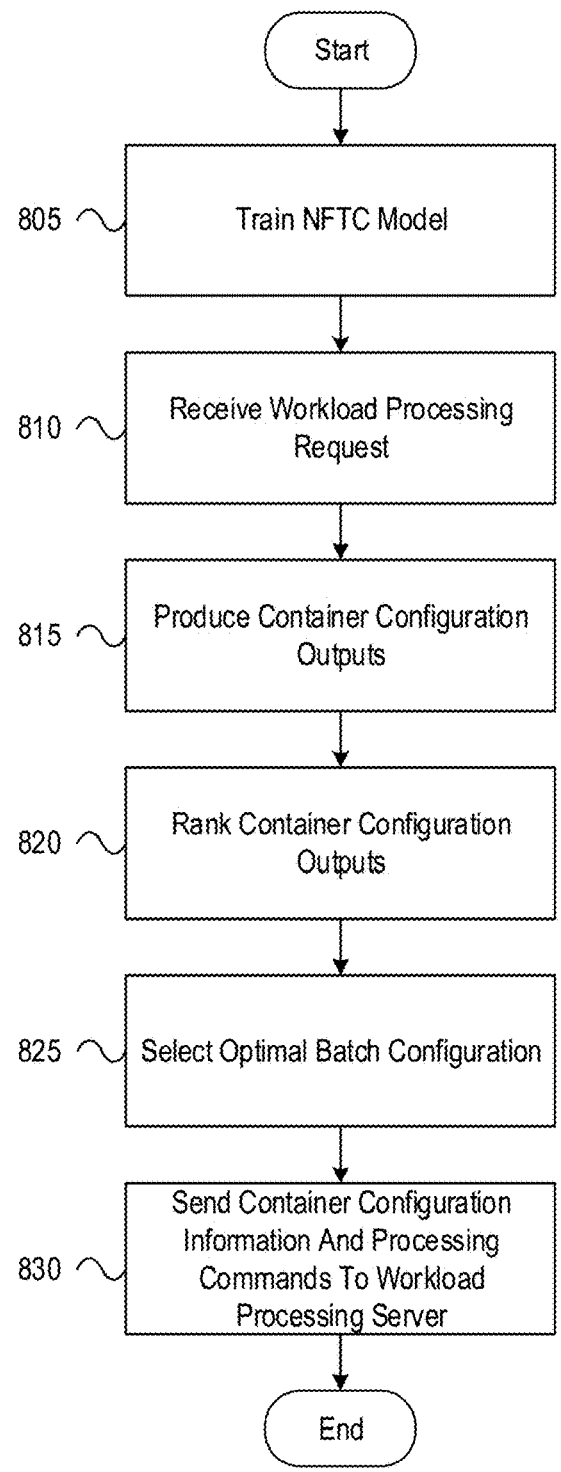
FIG. 8 depicts an illustrative method for a real time optimization apparatus using quantum non-fungible token contract ranking for dynamic code evolution in accordance with one or more example embodiments.

FIG. 8 depicts an illustrative method for a real time optimization apparatus using quantum non-fungible token contract ranking for dynamic code evolution in accordance with one or more example embodiments. Referring to FIG. 8, at step 805, a quantum computing platform comprising one or more processors, memory, and a communication interface may train an NFTC model. At step 810, the quantum computing platform may receive a workload processing request. At step 815, the quantum computing platform may produce container configuration outputs based on the workload processing request. At step 820, the quantum computing platform may rank the container configuration outputs using the NFTC model. At step 825, the quantum computing platform may select an optimal batch configuration based on the ranking. At step 830, the quantum computing platform may send container configuration information and processing commands to a workload processing server.

Figure 9:
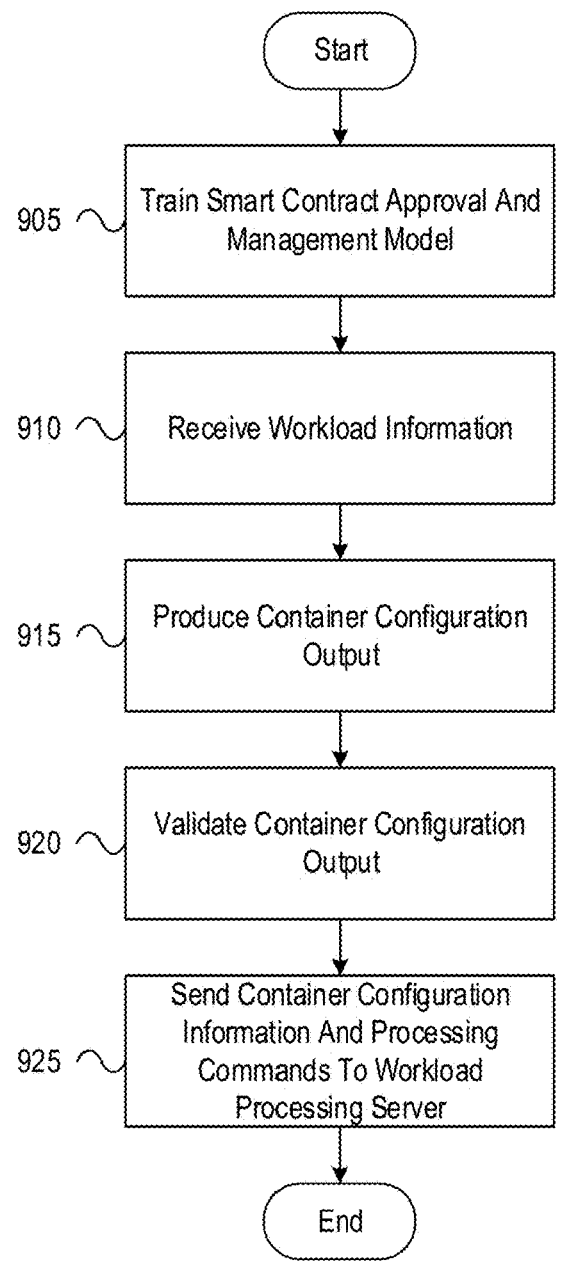
FIG. 9 depicts an illustrative method for a real time optimization apparatus using smart contracts for dynamic code validation and approval in accordance with one or more example embodiments.

FIG. 9 depicts an illustrative method for a real time optimization apparatus using smart contracts for dynamic code validation and approval in accordance with one or more example embodiments. Referring to FIG. 9, at step 905, a quantum computing platform comprising one or more processors, memory, and a communication interface may train a smart contract approval and management model. At step 910, the quantum computing platform may receive workload information. At step 915, the quantum computing platform may produce a container configuration output based on the workload information. At step 920, the quantum computing platform may validate the container configuration output using the smart contract approval and management model. At step 925, the quantum computing platform may send container configuration information and processing commands to a workload processing server.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A quantum computing platform comprising:
   at least one processor;
   a communication interface communicatively coupled to the at least one processor; and
   memory storing computer-readable instructions that, when executed by the at least one processor, cause the quantum computing platform to:
   establish a smart contract approval and management model, wherein the smart contract approval and management model includes:
   one or more rules for automated validation of container configuration outputs, and
   one or more rules for validation of the container configuration outputs based on receipt of approver information from a plurality of approvers identified in the smart contract approval and management model;
   receive, from a workload processing system, a data feed indicating current workload information;
   generate, based on the data feed, a first container configuration output, wherein the first container configuration output defines a batch configuration for use in processing the data feed;
   validate, using the one or more rules for automated validation, the first container configuration output; and
   send, to the workload processing system, the first container configuration output and one or more commands directing the workload processing system to process the data feed using the batch configuration defined by the first container configuration output, wherein sending the one or more commands directing the workload processing system to process the data feed using the batch configuration causes the workload processing system to process the data feed using the batch configuration.

2. The quantum computing platform of claim 1, wherein the one or more rules for automated validation of container configuration outputs define thresholds for each of a plurality of optimization criteria associated with the container configuration output.

3. The quantum computing platform of claim 2, wherein the optimization criteria includes one or more of:
   a performance score, corresponding to a processing speed of the container configuration outputs,
   a completeness score, corresponding to a completeness or lack of completeness of data elements as a result of use of the container configuration outputs,
   a correctness score, corresponding to an accuracy of data values as a result of use of the container configuration outputs, and
   an integrity score, based on data corruption or lack of the data corruption occurring as a result of use of the container configuration outputs.

4. The quantum computing platform of claim 2, wherein generating the first container configuration output comprises:
   generating, using a container configuration model and based on the data feed, a plurality of container configuration outputs including the first container configuration output;
   ranking, using a non-fungible token contract (NFTC) model and based on the optimization criteria, the plurality of container configuration outputs; and
   selecting a highest ranked container configuration output of the plurality of container configuration outputs.

5. The quantum computing platform of claim 4, wherein the plurality of container configuration outputs includes a second container configuration output, ranked immediately above the first container configuration output.

6. The quantum computing platform of claim 5, wherein the memory stores additional computer readable instructions that, when executed by the at least one processor, cause the quantum computing platform to:
   identify that the second container configuration output fails to satisfy at least one of the one or more rules for automated validation; and based on identifying that the second container configuration output fails to satisfy the at least one of the one or more rules for automated validation, select the first container configuration output for comparison to the one or more rules for automated validation.

7. The quantum computing platform of claim 1, wherein the memory stores additional computer readable instructions that, when executed by the at least one processor, cause the quantum computing platform to:
request, after validating, using the one or more rules for automated validation, the first container configuration output, approver information from one or more smart contract approvers identified in the smart contract approval and management model; and
receive the approver information, wherein the approver information indicates whether or not the respective one or more smart contract approvers approve implementation of the first container configuration output, wherein sending the first container configuration output and one or more commands directing the workload processing system to process the data feed using the batch configuration defined by the first container configuration output is based on identifying that consensus approval is achieved among the one or more smart contract approvers.

8. The quantum computing platform of claim 7, wherein the memory stores additional computer readable instructions that, when executed by the at least one processor, cause the quantum computing platform to:
identify that the consensus approval is not achieved for a second container configuration output; and
based on identifying that the consensus approval is not achieved for the second container configuration output, selecting the first container configuration output for comparison to the one or more rules for automated validation, wherein the first container configuration output comprises one or a plurality of container configuration outputs ranked immediately after the second container configuration output.

9. The quantum computing platform of claim 7, wherein a unique approval scheme corresponds to each of the one or more smart contract approvers.

10. The quantum computing platform of claim 9, wherein the unique approval scheme defines thresholds, for each of the optimization criteria, to be satisfied to receive approval from the corresponding smart contract approver.

11. The quantum computing platform of claim 9, wherein the unique approval scheme defines a weighting scheme, indicating a weight to be applied to the approver information from each of the one or more smart contract approvers.

12. The quantum computing platform of claim 9, wherein the memory stores additional computer readable instructions that, when executed by the at least one processor, cause the quantum computing platform to:
dynamically adjust, using a feedback loop, the unique approval scheme based on the consensus approval.

13. A method comprising:
at a quantum computing platform comprising at least one processor, a communication interface, and memory:
establishing a smart contract approval and management model, wherein the smart contract approval and management model includes:
one or more rules for automated validation of container configuration outputs, and
one or more rules for validation of the container configuration outputs based on receipt of approver information from a plurality of approvers identified in the smart contract approval and management model;
receiving, from a workload processing system, a data feed indicating current workload information;
generating, based on the data feed, a first container configuration output, wherein the first container configuration output defines a batch configuration for use in processing the data feed;
validating, using the one or more rules for automated validation, the first container configuration output; and
sending, to the workload processing system, the first container configuration output and one or more commands directing the workload processing system to process the data feed using the batch configuration defined by the first container configuration output, wherein sending the one or more commands directing the workload processing system to process the data feed using the batch configuration causes the workload processing system to process the data feed using the batch configuration.

14. The method of claim 13, wherein the one or more rules for automated validation of container configuration outputs define thresholds for each of a plurality of optimization criteria associated with the container configuration output.

15. The method of claim 14, wherein the optimization criteria includes one or more of:
a performance score, corresponding to a processing speed of the container configuration outputs,
a completeness score, corresponding to a completeness or lack of completeness of data elements as a result of use of the container configuration outputs,
a correctness score, corresponding to an accuracy of data values as a result of use of the container configuration outputs, and
an integrity score, based on data corruption or lack of the data corruption occurring as a result of use of the container configuration outputs.

16. The method of claim 14, wherein generating the first container configuration output comprises:
generating, using a container configuration model and based on the data feed, a plurality of container configuration outputs including the first container configuration output;
ranking, using a non-fungible token contract (NFTC) model and based on the optimization criteria, the plurality of container configuration outputs; and
selecting a highest ranked container configuration output of the plurality of container configuration outputs.

17. The method of claim 16, wherein the plurality of container configuration outputs includes a second container configuration output, ranked immediately above the first container configuration output.

18. The method of claim 17, further comprising:
identifying that the second container configuration output fails to satisfy at least one of the one or more rules for automated validation; and
based on identifying that the second container configuration output fails to satisfy the at least one of the one or more rules for automated validation, selecting the first container configuration output for comparison to the one or more rules for automated validation.

19. The method of claim 13, further comprising:
requesting, after validating, using the one or more rules for automated validation, the first container configuration output, approver information from one or more smart contract approvers identified in the smart contract approval and management model; and receiving the approver information, wherein the approver information indicates whether or not the respective one or more smart contract approvers approve implementation of the first container configuration output, wherein sending the first container configuration output and one or more commands directing the workload processing system to process the data feed using the batch configuration defined by the first container configuration output is based on identifying that consensus approval is achieved among the one or more smart contract approvers.

20. One or more non-transitory computer-readable media storing instructions that, when executed by a quantum computing platform comprising at least one processor, a communication interface, and memory, cause the quantum computing platform to:

establish a smart contract approval and management model, wherein the smart contract approval and management model includes:

one or more rules for automated validation of container configuration outputs, and one or more rules for validation of the container configuration outputs based on receipt of approver information from a plurality of approvers identified in the smart contract approval and management model;

receive, from a workload processing system, a data feed indicating current workload information;

generate, based on the data feed, a first container configuration output, wherein the first container configuration output defines a batch configuration for use in processing the data feed;

validate, using the one or more rules for automated validation, the first container configuration output; and send, to the workload processing system, the first container configuration output and one or more commands directing the workload processing system to process the data feed using the batch configuration defined by the first container configuration output, wherein sending the one or more commands directing the workload processing system to process the data feed using the batch configuration causes the workload processing system to process the data feed using the batch configuration.

* * * * *